Nov. 16, 1965 E. T. ABLE 3,217,533
TORQUE CALIBRATING DEVICE
Filed Sept. 26, 1963
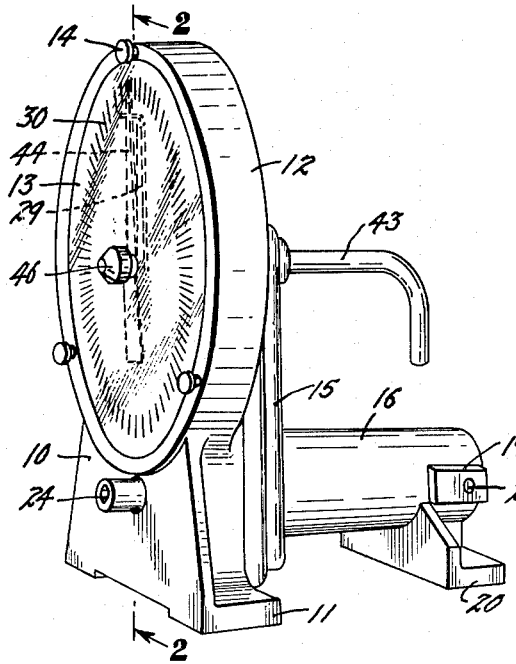
Fig-1
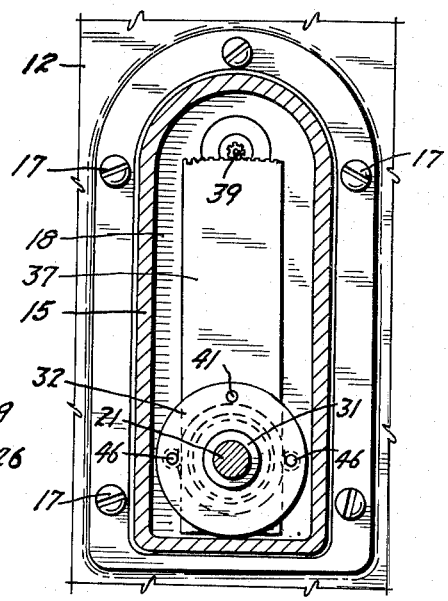
Fig-3
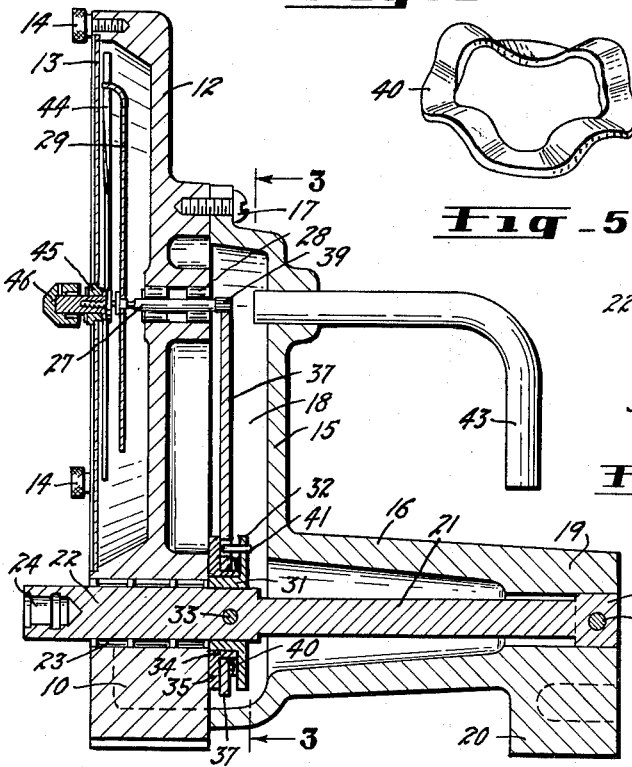
Fig-2
Fig-5
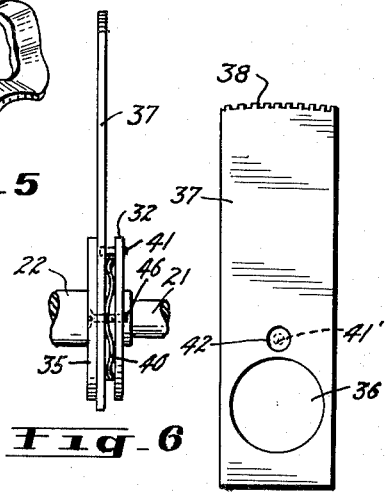
Fig-6
Fig-4
INVENTOR.
EDWARD T. ABLE
BY
ATTORNEY 3,217,533
TORQUE CALIBRATING DEVICE
Edward T. Able, Denver, Colo., assignor, by mesne assignments, to B. K. Sweeney Co., Denver, Colo., a corporation of Colorado
Filed Sept. 26, 1963, Ser. No. 311,853
6 Claims. (Cl. 73—134)

This invention relates to a torque calibrating device, that is, to a calibrated instrument by means of which torque output of tools such as torque wrenches, torque screw drivers and the like may be periodically tested to determine whether the various calibrations, signal devices, release mechanisms and other torque load settings of the tools are accurate so as to insure uniformity in the torque output which, of course, is the principal function of torque tools.

Torque tool gauges and testers of this general character are shown in applicant's prior Patent No. 2,651,935 granted September 15, 1953 and in applicant's copending application, Serial No. 218,294, now Patent No. 3,199,344, issued August 10, 1965.

One of the problems encountered with conventional torque testers results from the types of torque tools which suddenly release when a predetermined torque has been applied by the tool. The tester is under extreme torsional stress at the time of release and the sudden release of load results in violent back lash forces which damage and decrease the efficiency of the testing mechanism of the testing device.

The principal object of this invention is to provide a simple, portable, completely enclosed and highly efficient testing unit adaptable for use with any type of torque tool which will give an accurate, calibrated torque reading of torque loads of the tools and which will not be damaged by the reactive impact stresses resulting from the sudden breaking, releasing, or tripping of the tool being tested.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:
FIG. 1 is a perspective view of the torque calibrating device;
FIG. 2 is an enlarged vertical section therethrough, taken on the line 2—2, FIG. 1;
FIG. 3 is a fragmentary cross section looking forwardly on the line 3—3, FIG. 2;
FIG. 4 is a detail face view of a toothed segment lever employed in the invention;
FIG. 5 is a detail perspective view of a friction element or "wave washer," the use of which will be later described; and
FIG. 6 is a fragmentary detail view illustrating the mounting of a gear segment lever on a torsion bar as employed in the torque calibrating device of this invention to be later described.

The invention employs a main frame casting 10 provided with base flanges 11 and integrally supporting a vertical, dished dial cup 12, the front of which is closed by a circular, rotatable, transparent dial disc 13 which can be clamped in any desired circumferential position on the dial cup by means of suitable thumb screws 14.

A rear frame casting 15, having a rearwardly extending tubular portion 16 is secured to the rear of the main frame casting 10 such as by means of cap screws 17. The upper portion of the rear frame casting 15 is hollowed to form a lever chamber 18 and the rear extremity of the tubular portion 16 is closed by a relatively heavy integral mounting block 19 supported on a flanged base 20. To facilitate portability, a handle bar 43 is mounted in the rear casting and extends rearwardly therefrom.

A torsion bar 21 extends horizontally and axially through the tubular portion 16 and forwardly through the main casting 10. The forward extremity of the torsion bar is enlarged as shown at 22 and this enlarged portion is mounted in suitable anti-friction bearings 23 in the casting 10 and projects forwardly therefrom to provide a tool receiving extremity 24. The rear extremity of the torsion bar is similarly enlarged, as shown at 25, and the latter extremity is fixedly locked in the mounting block 19 by means of a shear pin 26. Torsion applied by a tool to the tool extremity 24 rotates the forward extremity 22, by applying a twist to the torsion bar, and this rotation is transmitted in multiplied relation to a dial shaft 27 mounted in anti-friction bearings 28 concentric of the dial cup 12. The dial shaft carries a pointer actuating hand 29 which actuates an index pointer 44 to indicate positions on a torque scale 30 engraved or printed on the dial disc 13.

The transmission of movement to the dial shaft 27 is accomplished by mounting a fixed hub 31 provided with a circular friction flange 32, on the enlarged extremity 22 of the torsion bar 21 such as by a tapered drive pin 33. A spacing sleeve 34, provided with a circular friction flange 35 similar to, and in parallel spaced relation with, the first friction flange 32, surrounds the hub 31. The spacing sleeve 34 passes through an axis opening 36 in a gear segment lever 37 provided with gear teeth 38 which mesh with a toothed pinion 39 on the rear of the dial shaft 27.

Thus, the segment lever is rotatably mounted between the two friction flanges 32 and 35 and is constantly urged into frictional engagement with the second friction flange 35 by means of a resilient, corrugated, wave washer 40 which surrounds the bearing sleeve 34 and which is compressed between the gear segment lever 37 and the first friction flange 32 by means of two clamp screws 46 which extend through the second friction flange and are threaded into the first friction flange.

Relative rotative movement between the torsion bar and the segment lever is limited to a predetermined degree by means of a limiting pin 41 fixedly mounted in the first friction flange 32 and projecting forwardly through an enlarged pin hole 42 in the gear segment lever. The diameter of the pin hole 42 exceeds the diameter of the limiting pin sufficiently to allow a predetermined free play between the pin 41 and the segment lever resisted only by the frictional engagement between the elements 32, 35, 37 and 40.

Since the maximum torque applied to the device by various torque tools often occurs for only a fraction of a second, means are provided for indicating the maximum swing made by the index hand 29. This is accomplished by mounting a manually actuatable indicating pointer 44 on a pointer pin extending through a friction bearing 45 at the axis of the dial disc 13 to a finger knob 46 on the face of the disc. The pointer 44 is in the path of travel of the index hand 29 and is carried forward by the latter to the point of maximum indication and will remain in place until manually returned.

The rotatable dial disc with the torque scale can be rotated to a zero indication and then locked in place by the thumb screws 14 to accurately preset the device for use.

It is believed that the use and operation of the device will be apparent to those skilled in the art from the preceding description. Briefly, to prepare the device, the pointer 44 is manually actuated rearwardly to push the index hand 29 rearwardly until the leading side of the pin hole 42 contacts the limiting pin 41 to remove all lost motion. The dial disc 13 is then, if necessary, preset to align the zero scale indication with the idle position of the index hand.

A torque tool is now applied to the tool receiving extremity 24 and is rotated forwardly to twist the torque bar and swing the index hand and the pointer 44 forward on the torque scale 30. When the maximum torque load is reached, the tool instantly releases allowing the torque bar to suddenly return to its at rest position. The sudden return rotation simply causes the limiting pin to move rearwardly in the enlarged pin hole 42 without impact and the frictional mounting of the gear segment lever gently returns it to the zero position without damage to the gear teeth 38, the pinion 39, or the index hand 29. The relative sizes between the limiting pin 41 and its pin hole 42 are indicated at 41′ in FIG. 4.

While a specific form of the invention has been described and illustrated herein, it is to be understood that the same may be varied, within the scope of the appended claims, without departing from the spirit of the invention.

Having thus described the invention, what is claimed and desired secured by Letters Patent is:

1. A torque load indicating device comprising:
   (a) a torsion bar fixedly mounted at one extremity and adapted to receive a torque tool at its other extremity;
   (b) a toothed segment lever mounted at one extremity on said torsion bar and projecting radially therefrom;
   (c) a rotatable, toothed pinion in mesh with said segment lever and rotated thereby;
   (d) a dial shaft extending axially from and affixed to said pinion;
   (e) a torsion-indicator hand mounted on said dial shaft and positioned to indicate positions on a torque scale; and
   (f) means for transmitting delayed movement from said torsion bar to said segment lever comprising:
   (g) motion imparting means fixedly mounted on said torsion bar; and
   (h) motion receiving means fixedly carried by said segment lever, said motion receiving means being independent of and positioned in the path of rotation of said motion imparting means so that the motion imparting means may rotate independently of said motion receiving means for a predetermined distance before contact is made between the two means.

2. A torque load indicating device as described in claim 1 having
   (a) means frictionally transmitting rotative motion from said torsion bar to said segment lever.

3. A torque load indicating device as described in claim 1 in which the means for transmitting delayed movement comprises:
   (a) a drive pin mounted to rotate with said torsion bar; and
   (b) a pin opening in said segment lever in which said drive pin is received, said pin opening being larger than said drive pin so that the latter may move transversely of the former to provide lost motion between said torsion bar and said segment lever.

4. A torque load indicating device as described in claim 2 in which the means for frictionally transmitting comprises:
   (a) a pair of spaced-apart flanges surrounding and affixed to said torsion bar, said segment lever being positioned between said flanges and
   (b) a resilient corrugated washer surrounding said torsion bar and positioned between one of said flanges and said segment lever and acting to urge said torsion bar into frictional contact with the other flange.

5. A torque load indicating device as described in claim 4 in which the means for transmitting delayed movement comprises:
   (a) a pair of spaced-apart flanges surrounding and affixed to said torsion bar, said segment lever being positioned between said flanges;
   (b) a drive pin mounted in one of said flanges eccentric of and parallel with said torsion bar; and
   (c) a pin opening in said segment lever in which said drive pin is received, said pin opening being larger than said drive pin so that the latter may move transversally of the former to provide lost motion between said torsion bar and said segment lever.

6. A torque load indicating device as described in claim 5 having
   (a) a resilient corrugated washer surrounding said torsion bar and positioned between one of said flanges and said segment lever and acting to urge said torsion bar into frictional contact with the other flange.

References Cited by the Examiner
UNITED STATES PATENTS
3,079,795   3/1963   Livermont _____ 73—1

LOUIS R. PRINCE, *Primary Examiner.*